Patented Jan. 1, 1946

2,392,253

UNITED STATES PATENT OFFICE 2,392,253

LUBRICANT

Robert L. May, Chicago, Ill., assignor to Sinclair Refining Company, New York, N. Y., a corporation of Maine No Drawing. Application July 14, 1943,
Serial No. 494,692

9 Claims. (Cl. 252—32.7)

This invention relates to a lubricating oil composition having improved characteristics, especially with respect to oxidation and corrosion.

In my co-pending application Serial No. 494,691 filed concurrently herewith, issued August 15, 1944, as Patent 2,356,074, I have described and claimed a new class of organic-metal compounds comprising the zinc salts of organic compounds resulting from the reaction of an aliphatic alcohol with a condensation product of a terpene, such as present in turpentine, and phosphorus pentasulfide. The turpentine-phosphorus pentasulfide condensation products and the materials resulting from the reaction thereof with the alcohol are the subject of my co-pending applications Serial No. 494,688, and Serial No. 494,689, respectively, each filed concurrently herewith, the latter having issued August 15, 1944, as Patent 2,356,073.

I have now discovered that the zinc salts of my first said application, and particularly those in the preparation of which an aliphatic alcohol having at least five carbon atoms per molecule is employed, are especially effective in repressing or inhibiting the deterioration of lubricating oil compositions and the corrosion of metal parts in contact therewith.

I am at present unable definitely to identify by chemical formula either the zinc salts or the condensation products of turpentine and phosphorus pentasulfide or the products resulting from the reaction of said condensation products with the alcohol. For convenience and brevity I shall herein refer to the former as my inhibitor, to the condensation product as the turpentine-$P_2S_5$ condensation product, and to the composition resulting from the reaction of the alcohol with the condensation product as the intermediate material, each of which is hereinafter more fully described.

Although the intermediate material itself has been found to be a desirable component of lubricating oil compositions, the use of such intermediate materials for this purpose is subject to certain disadvantages. For instance, it is subject to the objection that they have somewhat acidic characteristics, due to phosphorus acidity which has been found to have a tendency to promote sludging of mineral oil compositions. The lubricating oil compositions of my present invention are free from this objection.

In general my inhibitor may be prepared by reacting zinc oxide with the intermediate material by intimately admixing the zinc oxide and the intermediate material with moderate heating. The product of this reaction is then with advantage diluted and filtered to remove any excess or unreacted zinc oxide present. In the preparation of such compounds for use as a constituent of my improved lubricating oil compositions, the diluent is with advantage a light neutral lubricating oil fraction which may be permitted to remain in the product.

The characteristics of my inhibitors vary somewhat, depending upon the characteristics of the turpentine-$P_2S_5$ condensation product, the nature and proportions of the alcohol reacted therewith to form the intermediate material, the conditions under which the reactions are effected, and to some extent upon the proportions of zinc oxide and the intermediate material used in its production. Also the character of the inhibitor is influenced by the conditions under which the zinc oxide is reacted with the intermediate material.

The reaction temperature employed in the last mentioned reaction in the preparation of my inhibitor is with advantage maintained within the range of about 275° to 300° F. although reaction temperatures somewhat outside of this range are permissible. Also, I have found it desirable to use an amount of zinc oxide somewhat in excess of that equivalent to the acid number of the intermediate material and to filter off unreacted, excess zinc oxide as previously indicated.

The lubricating oil composition of my present invention may consist solely of the lubricating oil constituent and my inhibitor. However, the inhibitor of my present invention has been found to be compatible with other desirable lubricating oil addends and the inclusion of such other addends, especially addends of the type known as detergents, is within the contemplation of my present invention and constitutes an important aspect thereof.

The inclusion of certain so-called detergents, for instance, in internal combustion engine lubricants, has been found highly advantageous. An especially effective lubricating oil composition for the lubrication of internal combustion engines and the like, contemplated by my present invention, is one comprising, in addition to the lubricating oil constituent and my inhibitor, a minor proportion of the calcium salt of iso-octyl salicylate or the calcium salt of capryl salicylate. These calcium salts have been found particularly effective as detergents in lubricating oil compositions used in internal combustion engines, as more fully described in the Patents 2,347,547 and 2,339,692, issued April 25, 1944, and January 18, 1944, respectively, on applications of Willard L. Finley.

A further highly effective lubricating oil composition contemplated by my present invention is one comprising, in addition to the lubricating oil constituent and my inhibitor, a calcium petroleum sulfonate as a detergent. Other detergents which may be used with advantage include the barium phenolate of sulfurized diamyl phenol such as currently marketed under the trade name "Aerolube B," metallic phenolates of sulfurized tertiary amyl phenol, such as currently marketed under the trade names "Calcium Paranox" and "Barium Paranox," and various metallic soaps, either basic or neutral, metallic sulfonates, alcoholates, and alkoxides and metallic derivatives of alkylated salicylic acid.

When used in conjunction with these detergents, particularly the calcium salts, including calcium petroleum sulfonates previously mentioned, these detergents and my inhibitors have been found to complement each other so that the effectiveness of each is promoted. The tendency of the detergent to promote oxidation of the oil at the termination of its oxidation induction period is minimized by the presence of my inhibitor without destroying the effectiveness of either the detergent or the inhibitor.

The proportions of the inhibitor used in the compounding of my improved lubricating oil compositions may be varied somewhat, but in any case only a minor proportion is used. In the absence of a detergent such as previously mentioned, generally satisfactory results have been obtained by using proportions of the inhibitors within the range of about 0.01% to about 2% based on the weight of the oil constituent. Where detergents, such as the calcium salt detergents previously mentioned, are present, somewhat larger proportions, for instance, up to about 5%, may be used with advantage. In gear lubricants, for example, even larger proportions of my inhibitors may be employed.

As the lubricating oil constituent, various petroleum lubricating oil fractions may be used. For instance, solvent-treated Mid - Continent neutrals or a blend of such neutrals with bright stock or a solvent-refined lubricating oil fraction from a Pennsylvania crude, or various blends of such lubricating oil fractions, may be employed. Characteristics of several such oils which have been used with advantage, and which were used in the compounding of my lubricating oil compositions hereinafter set forth as illustrative of my invention, appear in the following Table I, in which base oil A is a Mid-Continent 250 neutral oil, base oil B is a solvent-treated Mid-Continent SAE 30 oil, base oil C is also a solvent-treated Mid-Continent oil, base oil D is a blend of a Pennsylvania neutral and a Mid-Continent aircraft oil, and base oil E is a solvent-refined Pennsylvania aircraft oil.

Table I

| | Base oil | | | | |
|---|---|---|---|---|---|
| | A | B | C | D | E |
| Gravity, °A. P. I. | 29.5 | 27.7 | 27.1 | 27.7 | 27.2 |
| Flash, °F | 405 | 435 | 465 | 455 | 540 |
| Fire, °F | 480 | 480 | 535 | 500 | 610 |
| Viscosity, at 100° F., SUS | 249.6 | 398.4 | 442.1 | 431.7 | 1,562 |
| Viscosity, at 210° F., SUS | 49.0 | 57.3 | 57.5 | 59.7 | 124.3 |
| Viscosity index | 92.7 | 93.0 | 80.6 | 85.5 | 106.5 |
| Pour | 5 | 0 | −10 | 10 | −5 |
| Carbon residue | 0.039 | 0.08 | 0.03 | 0.37 | 0.61 |
| Acid number | | | 0.05 | 0.025 | 0.025 |
| Per cent sulfur | | | 0.24 | 0.16 | 0.06 |

The molar proportions of $P_2S_5$, turpentine and alcohol, used in the preparation of the intermediate material which I reacted with zinc oxide in the preparation of my inhibitors may be varied over a considerable range. My inhibitors prepared from intermediate materials in the preparation which the molar proportions of $P_2S_5$, turpentine and alcohol respectively, are within the range of about 2:5:5 to about 2:5:3 have been found particularly desirable. However, this range may with advantage be varied from about 2:4:4 to about 2:7:1.

The nature of the inhibitor is also considerably influenced by the nature of the alcohol used in the preparation of the intermediate material. Aliphatic alcohols generally which contain no fewer than five carbon atoms per molecule may be used for this purpose. For example, those having from five to eighteen carbon atoms may be used with advantage. Where an alcohol having fewer than five carbon atoms per molecule is used, the product has been found to lack satisfactory oil solubility. Alcohols which have been used with advantage in the preparation of my inhibitors include straight-chain primary alcohols of five to eighteen carbon atoms per molecule, branched-chain primary alcohols of five and six carbon atoms, and secondary alcohols of five to eight carbon atoms, respectively. My lubricating oil compositions compounded from inhibitors prepared from intermediate materials in the preparation of which capryl, normal hexyl or lauryl alcohol was used have been found to have particularly desirable characteristics. Those containing inhibitors in the preparation of which capryl alcohol was used have been found to be especially desirable.

Since the characteristics of my improved lubricating oil compositions are somewhat influenced by the characteristics of the particular inhibitor employed, which in turn are influenced by the characteristics of the intermediate material from which my inhibitors are prepared, a detailed description of the preparation and the characteristics of the particular inhibitor used will be included in the specific illustrations of my invention hereinafter set forth. It will be understood, however, that my invention is not limited to the use of these particular inhibitors illustrated nor with respect to the method by which the inhibitor is prepared but includes lubricating oil compositions comprising the inhibitors herein described by whatever process the inhibitors may be made.

Generally, in the preparation of the turpentine-$P_2S_5$ condensation product used in the preparation of my inhibitors, the weight ratio of turpentine to $P_2S_5$ is with advantage within the range of about 1:1 to about 3:1. When ratios higher than about 3:1 are used the product has been found to contain considerable unreacted turpentine. Weight ratios of about 3:2 have been found to give particularly desirable results.

The reaction of turpentine with $P_2S_5$ is highly exothermic and proceeds spontaneously after being initiated by slight heating. A desirable method of effecting this reaction is to heat the turpentine in a vessel to about 200° F., and then, without further heating, slowly stirring in the phosphorus pentasulfide in the powdered form. The heat of reaction is great and consequently the sulfide should be added slowly so as to avoid the possibility of the reaction's becoming uncontrollable. For the purposes of my present invention, it is desirable that the temperature during this addition not be permitted to exceed about 250° F., although higher temperatures are permissible.

After the addition of the phosphorus pentasulfide is completed and the exothermic heating is lessened, it is usually necessary to apply heat externally to complete the reaction. The temperature during this last stage is preferably maintained at about 300° F., though temperatures of about 200° to 400° F. may be employed. The second stage of the reaction should be continued until all of the $P_2S_5$ is dissolved. The material thus prepared is a viscous liquid at elevated temperatures but, in the absence of excess turpentine, solidifies on cooling to room temperature.

In general, the intermediate material used in the preparation of my inhibitors may be prepared by adding the alcohol gradually to the turpentine-$P_2S_5$ condensation product, advantageously at a temperature of about 250° F. In reacting the alcohol with the turpentine-$P_2S_5$ condensation product, very little heat is evolved. After the alcohol has been added, the mixture is with advantage maintained at a temperature of 200° to 220° F. for about 2 hours with stirring. The nature and proportions of the alcohol added are subject to a considerable variation depending upon the particular characteristics of the product desired. The proportion of alcohol used is also dependent upon the ratio of turpentine to $P_2S_5$ used in the preparation of the condensation product from which the intermediate material is prepared.

The following specific examples of various members of my class of inhibitors and the procedure by which they have been successfully prepared are given as illustrative of the class:

EXAMPLE I

In a 3-liter, 3-necked flask, equipped with a stirrer, a thermometer and a funnel, there was placed 1360 grams (10 moles) of steam-distilled wood turpentine. The turpentine was heated to about 200° F. by means of an electric heater placed under the flask. The heat was then turned off, the stirrer started and 888 grams (4 moles) of powdered phosphorus pentasulfide slowly added to the heated turpentine portionwise. About 30 to 40 gram portions of the sulfide were added at first and after about half the sulfide was added the portions were increased to about 100 grams each. The temperature was controlled by the rate of addition of the phosphorus pentasulfide so that it did not exceed 250° F. When all the phosphorus pentasulfide had been added and the exothermic reaction had stopped, as shown by a dropping of the temperature, the heater was again turned on and the mixture stirred and heated slowly to 300° F., and maintained at that temperature for about 4 hours. At the end of this period, all of the phosphorus pentasulfide was dissolved and the product was a viscous amber-colored liquid. The heat was then turned off and the mixture allowed to cool to about 250° F., and, while at this temperature, 1300 grams (10 moles) of capryl alcohol (octanol-2) were added slowly over a period of 30 minutes. The heater was again turned on and the temperature held at 200 to 220° F. for 2 hours.

The intermediate material thus prepared was found by analysis to have an acid number of 114.2 and a saponification number of 146.9 and to contain 7.09% phosphorus and 17.4% sulfur, by weight.

222 grams of the resultant intermediate material was placed in a 1-liter beaker and 20 grams of zinc oxide was added. The mixture was then heated to 180° F. and stirred continuously for 1 hour. Thereafter, the temperature was raised slowly to 320° F. and held at that temperature for 15 minutes, the stirring being continued. 713 grams of 100-pale oil prepared from Gulf Coast crude, hereinafter more fully described, was then added and the mixture heated to 250° F., and, while at this temperature, 2% by weight of a filter-aid was added and the material filtered to remove any unreacted zinc oxide.

The product was found by analysis to have an acid number of 11.0 and to contain 1.72% phosphorus, 4.25% sulfur and 1.22% zinc, each by weight.

EXAMPLE II

An intermediate material was prepared as in Example I, except that 780 grams (6 moles) of capryl alcohol was added instead of the amount specified in Example I. The resultant intermediate material was found by analysis to have an acid number of 71, a saponification number of 162.9 and to contain 8.07% phosphorus and 20.3% sulfur, each by weight.

210 grams of this intermediate material was placed in a 1-liter beaker with 30 grams of zinc oxide, the mixture was stirred and heated to 180° F. for 1 hour and then slowly heated to 320° F. and held at that temperature for 15 minutes. Thereafter, 615 grams of the 100-pale oil used in Example I was added and the mixture heated and filtered as described in the previous example.

The product was found by analysis to have an acid number of 7.6 and to contain 2.06% phosphorus, 5.05% sulfur and 1.42% zinc, each by weight.

EXAMPLE III

In a 5-liter flask, equipped as described in Example I, there was placed 2040 grams (15 moles) of steam-distilled wood turpentine, the turpentine was heated to about 200° F., the heat turned off and 1332 grams (6 moles) of powdered phosphorus pentasulfide was added portionwise and stirred into the turpentine. The first half of the sulfide was added in about 50 gram portions and the second half in about 100–150 gram portions. The rate of addition was controlled so that the temperature of the reaction did not exceed 300° F. When the last of the sulfide was added and the heat of the reaction began to subside, external heat was applied and the reaction mixture stirred and heated to about 300° F., and maintained at this temperature for about 4 hours while stirring. At the end of this period, the phosphorus pentasulfide was dissolved. The heater was then turned off, the contents of the flask permitted to cool to 250° F., and, while at this temperature, 1170 grams (9 moles) of capryl alcohol was slowly added. After all the alcohol had been added, the temperature of the mixture was maintained at 200 to 220° F. for about 2 hours.

The intermediate material resulting from the above-described procedure was found by analysis to have an acid number of 64.9, a saponification number of 156.8, and to contain 8.2% phosphorus and 20.8% sulfur, by weight.

8853 grams of the intermediate material, resulting from this operation and from a second identical operation, was placed in a 5 gallon pail equipped with a stirrer and heated by an electric hot plate. 675 grams of zinc oxide was added and the mixture slowly heated to 180 to 190° F., with vigorous stirring to keep the material from caking on the bottom of the pail. As a result of the reaction, water was eliminated and there was considerable foaming of the mixture. When the water of reaction was eliminated, as evidenced by the cessation of the foaming, the temperature was slowly increased to a maximum of 300° F., and held at that temperature for about 2 hours. The reaction product was then diluted with 8853 grams of a Mid-Continent neutral oil, hereinafter more fully described, heated to 250° F., and filtered as previously described.

The product was found by analysis to have an acid number of 18.7 and to contain 3.79% phosphorus, 8.48% sulfur and 2.06% zinc, by weight.

Example IV 680 grams (5 moles) of turpentine was placed in a 2-liter flask, such as previously described, and stirred while being heated to 225° F. 444 grams of powdered phosphorus pentasulfide was then added to the turpentine at such a rate that the temperature did not rise above 250° F. After all the sulfide had been added, the temperature of the mixture was raised to 300° F., and maintained at that temperature for about 3 hours, at the end of which period all the phosphorus and sulfide was dissolved. The mixture was then permitted to cool to 250° F., and 264 grams of "Pentasol," a commercial mixture of amyl alcohols, was added. The temperature was then maintained at 220° for an additional hour.

The intermediate material thus prepared was found by analysis to have an acid number of 74.6 and a saponification number of 181.1 and to contain 9.23% phosphorus and 21.5% sulfur by weight.

750 grams of this intermediate material and 120 grams of zinc oxide were heated with stirring in a 2-liter beaker for 1 hour at 180° F., and finally heated at 300° F., for 30 minutes. Thereafter, 2250 grams of the Mid-Continent neutral oil, used in Example III, was added, the mixture heated to a temperature of 250° and the product filtered at this temperature. On cooling, a slight precipitate formed. Upon the addition of further lubricating oil to portions of the product in amounts sufficient to produce concentrations of about 1% to 5% of the product, a haze formed in the oil mixtures but was readily removed by filtration without detriment to the product.

The product was found by analysis to have an acid number of 15.5 and to contain 1.88% phosphorus, 5.10% sulfur and 1.07% zinc, by weight.

Example V 680 grams (5 moles) of steam-distilled turpentine was placed in a 3-liter flask, such as previously described, and heated to 225° F. There was then added 444 grams (2 moles) of powdered phosphorus pentasulfide in 25 to 30 gram portions at such a rate as to hold the temperature below 250° F. When all of the phosphorus pentasulfide was added, the mixture was heated to 300° F. and maintained at this temperature for 3 hours, at the end of which period the phosphorus pentasulfide was dissolved. The mixture was then cooled to 250° F., and 306 grams (3 moles) of 2-ethyl butanol-1 was added over a period of 30 minutes with continuous stirring and the temperature held at about 200 to 220° F. for 1 hour after the addition of the alcohol.

The intermediate material thus produced was found by analysis to have an acid number of 74.9 and a saponification number of 176.2 and to contain 8.96% phosphorus and 22.1% sulfur by weight.

1185 grams of this intermediate material and 120 grams of zinc oxide were heated and stirred in a 2-liter beaker, as in Example IV, and 3555 grams of the Mid-Continent neutral oil used in Example III was added, the mixture heated to 250° F., and filtered while hot. As in Example IV, the product was not entirely soluble in the lubricating oil fraction in this concentration but produced clear solutions upon further filtration.

The product was found by analysis to have an acid number of 18.3 and to contain 1.98% phosphorus, 5.42% sulfur and 1.10% zinc by weight.

Example VI

A 3-liter, round-bottomed flask, fitted with a stirrer, was charged with 680 grams of turpentine. The turpentine was heated to 200° F., heating discontinued and 444 grams of powdered phosphorus pentasulfide was added, with stirring, in portions of about 25 to 30 grams each and at a rate such that the temperature did not rise above 250° F. After all the phosphorus pentasulfide had been added, the temperature was raised to 300° F., and maintained at that temperature for 3 hours, at the end of which period all of the sulfide was dissolved. Thereafter, the mixture was cooled to 250° F. and 306 grams of normal hexyl alcohol was added and the temperature of the mixture held at about 200° F. for about 1 hour.

The resultant intermediate material was found by analysis to have an acid number of 74.0 and a saponification number of 172.1 and to contain 8.20% phosphorus and 21.57% sulfur by weight.

685 grams of this intermediate material and 120 grams of zinc oxide were admixed and heated as in Example IV, the product diluted with 2055 grams of the Mid-Continent neutral oil and filtered. This product was not completely oil-soluble but upon further dilution and filtration a clear solution was obtained.

The product was found by analysis to have an acid number of 19.9 and to contain 2.13% phosphorus, 5.51% sulfur and 1.58% zinc, by weight.

Example VII 340 grams (2.5 moles) of turpentine was heated to 200° F., and 222 grams (1 mole) of powdered phosphorus pentasulfide was added slowly as previously described. After the sulfide was all dissolved, 279 grams (1.5 moles) of "Lorol," a commercial mixture of alcohols made from hydrogenated fatty acid esters from palm oil and containing from 10 to 14 carbon atoms per molecule, was added and the mixture maintained for 1 hour at a temperature of 220° F.

The resultant intermediate material was found by analysis to have an acid number of 67.2 and a saponification number of 147.3 and to contain 7.18% phosphorus and 19.80% sulfur, by weight.

654 grams of this intermediate material and 48 grams of zinc oxide were placed in a 1500 milliliter beaker and stirred while being heated slowly to 300° F. At about 190° F. to 220° F. some foaming and water evolution took place. The heating extended over a period of about 1 hour. Thereafter, the product was diluted by the addition of 654 grams of the Mid-Continent neutral oil, the mixture heated to 250° F. and filtered.

The product was found by analysis to have an acid number of 21.9 and to contain 3.48% phosphorus, 8.65% sulfur and 1.71% zinc by weight.

Example VIII

To a turpentine-$P_2S_5$ condensation product, prepared as in Example VII, there was added 405 grams (1.5 moles) of octadecyl alcohol and the mixture maintained at 220° F. for 1 hour. The resulting intermediate product was found by analysis to have an acid number of 57.2 and a saponification number of 131.6 and to contain 6.52% phosphorus and 17.20% sulfur by weight.

742 grams of this intermediate material and 47 grams of zinc oxide were placed in a 1500 milliliter beaker and stirred while being slowly heated to 300° F. Thereafter, the product was diluted by the addition of 742 grams of the Mid-Continent neutral lubricating oil and the mixture heated to 250° F., and filtered. This product was found by analysis to have an acid number of 19.8 and to contain 2.91% phosphorus, 6.90% sulfur and 1.90% zinc by weight.

The 100-pale oil diluent used in the foregoing Examples I and II and the Mid-Continent neutral oil used in the foregoing Examples III to VIII, inclusive, had the following characteristics:

|  | 100-pale oil | Mid-Continent neutral |
|---|---|---|
| Gravity, ° A. P. I. | 22.1 | 27.9 |
| Flash, °F. | 300 | 365 |
| Fire, °F. | 350 | 405 |
| Viscosity at 100 S. U. S. | 107.8 | 107.8 |
| Viscosity at 210 S. U. S. | 38.4 | 39.5 |

Further illustrations of the inhibitors used in the compounding of my improved lubricating oil compositions appear in the following tabulation. The respective members of the group were prepared according to the general procedure previously described. In each of these examples, the alcohol used was capryl alcohol. For a more complete description of the resultant inhibitor specific reaction conditions and proportions of the several constituents, together with the characteristics of the intermediate materials used in their preparation, are included.

absence of excess turpentine, normally a brittle, resinous solid. It is with advantage prepared from turpentine, either steam distilled turpentine or gum spirits, consisting mainly of alpha pinene, a bi-cyclic terpene having the empirical formula $C_{10}H_{16}$. Pure alpha pinene, and other more costly terpenes, will react similarly with $P_2S_5$, but for reasons including economical considerations, I prefer to use the more readily available turpentine. The turpentine used in the specific examples appearing herein was a technical grade steam-distilled wood turpentine comprising about 90% alpha pinene.

The advantages of my present invention with respect to oxidation and corrosion characteristics of my improved lubricating oil compositions are illustrated by their mean oxygen absorption rates as compared with the oxygen absorption rate of the base oil and the corrosion losses of bearing metal in contact with the respective lubricants.

For example, the previously noted base oil A was found by conventional tests carried on at 360° F. to have a mean oxygen absorption rate of 2.8 cc. per minute in the absence of a detergent, copper-lead bearing metal or other oxidation catalyst. A composite of the inhibitors of the foregoing Example I, II, IX to XXI inclusive, and XXV was prepared and was found by analysis to have an acid number of 15.2 and to contain 1.86% phosphorus, 4.62% sulfur, and 1.07% zinc, by weight. By compounding 0.5 weight per cent of the composite inhibitor with base oil A, the mean oxygen absorption rate of the oil was reduced to 2.3 cc. per minute. Under the same test conditions the mean oxygen absorption rate of this base oil was reduced to 2.2 cc. per minute by compounding therewith 0.2 weight per cent of this composite inhibitor.

In the presence of copper-lead bearing metal the mean oxygen absorption rate of base oil A

| Example No. | Intermediate material prepared from— | | | Analysis of intermediate material | | | | Preparation of final product | | | | Analysis of final product | | | |
|---|---|---|---|---|---|---|---|---|---|---|---|---|---|---|---|
| | $P_2S_5$, mols | Turpentine, mols | Alcohol, mols | Acid No. | Sap. No. | P, wt., per cent | S, wt., per cent | Intermediate material, gms. | Zinc oxide, gms. | Max. temp., °F. | Conc. of product in final oil concentrate | Acid No. | P, wt., per cent | S, wt., per cent | Zn, wt., per cent |
| IX | 2 | 4.9 | 3.1 | 71.1 | 138.8 | 8.04 | 20.4 | 150 | 50 | 250 | 25 | 7.75 | 1.95 | 4.90 | 1.80 |
| X | 2 | 4.9 | 3.1 | 71.1 | 138.8 | 8.04 | 20.4 | 150 | 50 | 190 | 100 | 19.7 | 7.84 | 19.9 | 5.70 |
| XI | 2 | 5 | 5 | 55.6 | 136.1 | 6.77 | 16.9 | 1,000 | 174 | 300 | 25 | 13.3 | 1.74 | 4.14 | 1.27 |
| XII | 2 | 5 | 6 | 55.6 | 136.1 | 6.77 | 16.9 | 500 | 51 | 300 | 25 | 12.4 | 1.71 | 4.22 | 0.79 |
| XIII | 4 | 10 | 10 | 114.2 | 146.9 | 7.09 | 17.4 | 222 | 20 | 250 | 25 | 11.4 | 1.73 | 4.30 | 1.04 |
| XIV | 4 | 10 | 10 | 114.2 | 146.9 | 7.09 | 17.4 | 222 | 30 | 250 | 25 | 7.0 | 1.69 | 4.12 | 1.13 |
| XV | 4 | 10 | 6 | 71.0 | 162.9 | 8.07 | 20.3 | 210 | 20 | 250 | 25 | 10.5 | 2.10 | 5.24 | 1.10 |
| XVI | 4 | 10 | 6 | 71.0 | 162.9 | 8.07 | 20.3 | 210 | 30 | 250 | 25 | 10.4 | 2.04 | 4.92 | 1.31 |
| XVII | 4 | 10 | 6 | 71.0 | 162.9 | 8.07 | 20.3 | 210 | 30 | 250 | 25 | 10 | 2.06 | 5.24 | 1.15 |
| XVIII | 4 | 10 | 6 | 71.0 | 162.9 | 8.07 | 20.3 | 210 | 40 | 300 | 25 | 12.6 | 2.04 | 5.16 | 1.17 |
| XIX | 4 | 10 | 6 | 71.0 | 162.9 | 8.07 | 20.3 | 945 | 150 | 300 | 25 | 10.6 | 1.94 | 4.72 | 0.76 |
| XX | 4 | 10 | 6 | 71.0 | 162.9 | 8.07 | 20.3 | 520 | 185 | 275 | 25 | 9.9 | 1.96 | 5.17 | 1.50 |
| XXI | 6 | 15 | 9 | 65 | 92.1 | 7.88 | 20.4 | 520 | 185 | 275 | 25 | 10.4 | 1.97 | 4.83 | 0.82 |
| XXII | 6 | 15 | 9 | 65 | 92.1 | 7.88 | 20.4 | 1,514 | 120 | 300 | 50 | 25.8 | 4.05 | 9.45 | 2.05 |
| XXIII | 6 | 15 | 9 | 65 | 92.1 | 7.88 | 20.4 | 1,514 | 100 | 300 | 50 | 29.9 | 4.04 | 9.84 | 1.70 |
| XXIV | 6 | 15 | 9 | 65 | 92.1 | 7.88 | 20.4 | 1,514 | 88 | 300 | 50 | 32.0 | 39.6 | 9.59 | 1.75 |
| XXV | 6 | 15 | 9 | 64.9 | 156.8 | 8.02 | 20.8 | 520 | 185 | 275 | 25 | 9.0 | 1.63 | 4.12 | 0.77 |
| XXVI | 6 | 15 | 9 | 64.9 | 156.8 | 8.02 | 20.8 | 1,514 | 100 | 300 | 50 | 20.2 | 3.95 | 10.37 | 2.02 |

From the foregoing specific illustrations it appears that the combining ratios of zinc oxide and the intermediate material varies somewhat with the excess of zinc oxide present and also the temperature at which the reaction is effected. The duration of the reaction period also appears to influence the zinc content of the finished inhibitor. As previously noted, the presence of a considerable excess of zinc oxide during the reaction is usually desirable.

The turpentine-$P_2S_5$ condensation product used in the preparation of my inhibitors is, in the was 25.6 cc. per minute and the bearing metal corrosion loss was 5.8 mgs. By compounding therewith 0.5 weight per cent of the previously noted composite inhibitor the mean oxygen absorption rate was, under identical test conditions, reduced to 3.3 cc. per minute and no corrosion loss was apparent.

Further the oxidation induction period of the uninhibited blend of the base oil with 1% of the calcium iso-octyl salicylate detergent was about 170 minutes, and by compounding therewith 0.5% of this inhibitor the oxidation induction period was essentially eliminated, the mean oxygen absorption rate over a period of 650 minutes being only 1.54 cc. per minute.

A blend of this base oil and 1% of the calcium iso-octyl salicylic had, in the presence of copper-lead bearing metal an oxidation induction period of 107 minutes and during the test the bearing metal corrosion loss was found to be 11 mgs. By compounding with this blend 0.5% of the inhibitor, the oxidation induction period was substantially eliminated, the mean rate of oxygen absorption during the first 300 minutes of the test being 1.2 cc. per minute and during the remainder of the 490 minute test being 3.4 cc. per minute, indicating that the calcium of the detergent was largely though not completely deactivated. Further, during the test of the inhibited blend no bearing metal corrosion loss was experienced.

Using only 0.3% of this inhibitor in the blend of base oil A and 1% of the calcium iso-octyl salicylic detergent, the oxidation induction period in the presence of copper-lead bearing was increased from 107 to 239 minutes and the bearing metal corrosion loss was decreased from 11 mgs. to only 1.8 mgs.

Further, iron naphthenate in the presence of the lubricating oil compositions of my present invention is substantially deactivated. For instance, in the presence of iron naphthenate equivalent to 0.01% $Fe_2O_3$ the mean oxidation absorption rate of the uninhibited detergent blend was 45.6 cc. per minute due to the pro-oxidant catalytic action of the iron naphthenate. The mean oxygen absorption rate of my improved lubricating oil composition comprising the same blend and 0.5% of this composite inhibitor had, under identical conditions a mean oxygen absorption rate of 4.6 cc. per minute.

The results of these and other oxidation and corrosion tests of my improved lubricating oil compositions, compounded with various of the inhibitors specifically identified herein, as compared with the oxidation and corrosion characteristics of the base oil alone, are set forth in the following Table II. These tests were carried out at a temperature of 360° F. and no detergent was present. Copper-lead bearing metal was present in the respective lubricants during these tests. The identity of the particular inhibitor used has reference to the specific examples of my inhibitors previously set forth herein.

*Table II*

| Test No. | Base oil | Inhibitor | | Mean rate $O_2$ absorption, cc./min./ 100 gms. | Bearing metal corrosion loss, mgs. |
|---|---|---|---|---|---|
| | | Identity | Proportion, percent | | |
| 1 | A | None | | 25.6 | 5.8 |
| 2 | A | Composite | 0.5 | 3.3 | None |
| 3 | A | Ex. IV | 0.5 | 6.3 | 3.5 |
| 4 | A | Ex. IV | 0.75 | 4.2 | 0.1 |
| 5 | A | Ex. V | 0.5 | 9.6 | 4.2 |
| 6 | A | Ex. V | 0.75 | 7.7 | 0.6 |
| 7 | A | Ex. VI | 0.5 | 6.7 | 3.9 |
| 8 | A | Ex. VI | 0.75 | 6.6 | 1.6 |
| 9 | A | Ex. VII | 0.5 | 13.2 | 5.5 |
| 10 | A | Ex. VII | 1.0 | 7.2 | 0.6 |
| 11 | A | Ex. VIII | 0.5 | 14.2 | 4.4 |
| 12 | A | Ex. VIII | 1.0 | 8.0 | 0.3 |

The inhibitor used in test No. 2 was the composite inhibitor, previously identified.

A blend of base oil A with 1% of the calcium iso-octyl salicylic had an oxidation induction period of 107 minutes, in the presence of copper-lead bearing metal, and the corrosion loss of the bearing metal was 11 mgs. as previously noted. By the addition of various inhibitors of my pressent invention, in proportions as indicated in the following Table III, the oxidation induction period and corrosion losses were as therein indicated. The identity of the particular inhibitor used has reference to the specific examples of my inhibitors previously set forth herein.

*Table III*

| Test No. | Base oil of blend | Inhibitor | | Oxygen induction period, minutes | Bearing metal corrosion loss, mgs. |
|---|---|---|---|---|---|
| | | Identity | Proportion, percent | | |
| 1 | A | None | | 107 | 11 |
| 2 | A | Composite | 0.5 | 300 | None |
| 3 | A | Ex. IV | 0.5 | 296 | None |
| 4 | A | Ex. V | 0.5 | 264 | 4.9 |
| 5 | A | Ex. V | 0.75 | 240 | 0.7 |
| 6 | A | Ex. VI | 0.5 | 293 | None |
| 7 | A | Ex. VII | 0.5 | 278 | 2.5 |
| 8 | A | Ex. VII | 0.75 | 320 | None |
| 9 | A | Ex. VIII | 0.5 | 190 | 8.3 |
| 10 | A | Ex. VIII | 0.75 | 330 | None |

The results of these tests show that in each instance oxidation of the oil and corrosion of the bearing metal were materially repressed by the inhibitors of my invention, though in some instances, more of the inhibitor was required for substantially complete protection than in others. These and other tests indicate that the calcium of the detergent, which normally acts as a pro-oxidant following the induction period, is substantially deactivated in my improved lubricating oil compositions.

The deactivation of the calcium by my detergent is not limited to the calcium of the calcium salicylates but is also effective against other calcium-containing detergents. For example, a blend of base oil B and 2.2% of a calcium petroleum sulfonate detergent in the absence of pro-oxidant bearing metal had a mean oxygen absorption rate, by the conventional tests previously noted, of 8.7 cc. per minute and, in the presence of copper-lead bearing metal, had a mean oxygen absorption rate of 13.7 cc. per minute and a bearing metal corrosion loss of 5.2 mgs. The lubricating oil composition of my present invention resulting from the compounding of the various indicated proportions of the composite detergent previously described with this base oil and 2.2% of the calcium petroleum sulfonate detergent had, in the presence of copper-lead bearing metal, oxidation and corrosion characteristics as set forth in the following Table IV:

*Table IV*

| Test No. | Inhibitor, percent | Mean rate of $O_2$ absorption cc./min./100 gms. | Bearing metal corrosion loss, mgs. |
|---|---|---|---|
| 1 | 0.3 | 8.7 | 2.9 |
| 2 | 0.4 | 4.1 | None |
| 3 | 0.5 | 3.6 | 0.4 |
| 4 | 1.0 | 4.7 | None |

The results of these tests and tests of similar lubricating oil compositions indicated that the inhibitors of my present invention are compatible with, and are generally effective in inhibiting the pro-oxidant tendencies of, these and similar calcium-containing detergents. In the lubricating oil compositions of Table IV the amount of the calcium petroleum sulfonate used (2.2%) was equivalent to 0.055% calcium in the oil blend. It appears therefrom that 0.3% of the composite inhibitor was insufficient completely to inhibit this amount of calcium. However, 0.4% was sufficient to eliminate completely the bearing metal corrosion loss. The amount of inhibitor required for optimum results varied somewhat with the particular inhibitor used.

The effectiveness of my improved lubricating oil composition in inhibiting oil deterioration and bearing metal corrosion further appears from results of tests made in accordance with the procedure recommended by the American Society of Testing Materials, published October, 1942, and entitled "Proposed method of test for oxidation characteristics of heavy duty crankcase oils" and conveniently known as the "Chevrolet Engine Test." These tests were run on the base oil alone and also on lubricating oil compositions comprising such base oils compounded in accordance with my present invention.

Results representative of such tests are set forth in the following Table V. In test No. 1 base oil C alone was used. In test No. 2 the lubricating oil composition consisted of base oil C compounded with 0.125% of the previously described composite inhibitor, and in tests Nos. 3 and 4 the lubricating oil composition tested consisted of base oil C, 1% of said composite inhibitor and a detergent. The detergent used in the compounding of test No. 3 was 2% of the calcium salt of capryl salicylic, and that of the composition of test No. 4 was 5% of a calcium soap of oxidized petroleum acids. The engine cleanliness rating, analysis of the lubricants at the end of the tests, and the corrosion losses per half bearing of copper-lead bearing metal during the tests were as indicated in Table V.

Table V

| | Test No. | | | |
|---|---|---|---|---|
| | 1 | 2 | 3 | 4 |
| Engine cleanliness rating | 91 | 95 | 93 | 95 |
| Used oil tests: | | | | |
| Naphtha insolubles......percent.. | 1.31 | 0.92 | 0.75 | 0.78 |
| CHCl₃ soluble............do.... | 0.44 | 0.14 | 0.48 | 0.17 |
| Neutralization No................ | 1.70 | 1.00 | 0.18 | 0.70 |
| Bearing metal corrosion loss...grams.. | 0.307 | 0.081 | 0.020 | 0.036 |

From these tests it appears that oil deterioration and bearing corrosion are inhibited by my improved lubricating oil compositions whether or not a detergent is present. The results of test No. 2 indicate, however, that for optimum results a higher proportion of the inhibitor should be used.

Results of similar tests of lubricating oil compositions comprising base oil D compounded with a detergent and various proportions of the previously noted composite inhibitor, in the presence of Cu-Pb bearing metal, are set forth in the following Table VI. In test No. 1 thereof, the oil composition tested consisted of base oil D, 1% of the inhibitor and 5% of the previously mentioned calcium soap of oxidized petroleum acids, as the detergent. The oil composition of test No. 2 consisted of base oil D with 0.75% of the inhibitor and an amount of the calcium petroleum sulfonate equivalent to 0.054% calcium in the blend. The proportions of these addends are in each instance based on the weight of the lubricating oil constituent.

Table VI

| | Test No. | |
|---|---|---|
| | 1 | 2 |
| Engine cleanliness rating | 96 | 90 |
| Used oil tests: | | |
| Naphtha insoluble............percent.. | 1.05 | 0.97 |
| CHCl₃ soluble.................... | 0.37 | 0.22 |
| Neutralization No................. | 1.9 | 1.75 |
| Bearing metal corrosion loss............grams.. | 0.0715 | 0.041 |

That aircraft lubricating oils, such as that herein designated base oil E, are likewise materially improved by compounding in accordance with the present invention is illustrated by the results of tests of this oil alone and of my improved lubricating oil compositions consisting of such oil and a minor proportion of my inhibitor. In conducting such tests I have used the procedure described in an article by H. C. Mougey appearing in "Refiner and Natural Gasoline Manufacture," 15, 493–8 (1936). In these tests the lubricant charge was 24 lbs., the bearing temperature was 300° F., the journal speed was 2530 R. P. M., and the bearing load was 2700 lbs. per square inch. In these tests the oil in the sump oxidized rapidly and became corrosive to copper-lead bearings. The bearings were weighed and replaced at intervals, the test being continued until a total loss in weight of 100 mgs. per half bearing shell had occurred.

Results representative of such tests are set forth in the following Table VII. The inhibitor used in test No. 2 was that previously identified as my composite inhibitor.

Table VII

| | Test No. | |
|---|---|---|
| | 1 | 2 |
| Inhibitor.............................percent.. | None | 0.50. |
| Bearing loss at end of 65 hrs................ | 44.5 mgs | 10 mgs. |
| Bearing loss at end of 78 hrs................ | 100 | 12.5 mgs. |
| Bearing loss at end of 206 hrs............... | | 44.5 mgs. |

In addition to inhibiting oxidation and corrosion, I have found the lubricating oil conditions of my present invention to have definite detergent properties, even in the absence of detergents such as previously described. This fact is illustrated by the tests of Table V wherein the engine cleanliness rating was increased from 91 to 95 by compounding with the base oil 0.125% of my inhibitor, no other detergent being present.

I claim:

1. A lubricating oil composition comprising a petroleum lubricating oil and a proportion, effective to retard oxidation of the composition, of the reaction product of zinc oxide and an organic compound resulting from the reaction of a monohydroxy aliphatic alcohol, having not fewer than 5 carbon atoms per molecule, with a condensation product of turpentine and phosphorus pentasulfide.

2. A lubricating oil composition comprising a petroleum lubricating oil and about 0.1% to 2%, based on the weight of the oil constituent, of the reaction product of zinc oxide and an organic compound resulting from the reaction of a monohydroxy aliphatic alcohol, having not fewer than 5 carbon atoms per molecule, with a condensation product of turpentine and phosphorus pentasulfide.

3. A lubricating oil composition comprising a petroleum lubricating oil, a calcium salt of an isooctyl salicylate detergent and about 0.1% to 5% of a reaction product of zinc oxide and an organic compound resulting from the reaction of a monohydroxy aliphatic alcohol, having not fewer than 5 carbon atoms per molecule, with a condensation product of turpentine and phosphorus pentasulfide.

4. A lubricating oil composition comprising a petroleum lubricating oil, a calcium petroleum sulfonate detergent and a proportion, effective to retard oxidation of the composition, of the reaction product of zinc oxide and an organic compound resulting from the reaction of a monohydroxy aliphatic alcohol, having not fewer than 5 carbon atoms per molecule, with a condensation product of turpentine and phosphorus pentasulfide.

5. A lubricating oil composition comprising a petroleum lubricating oil and a proportion, effective to retard oxidation of the composition, of the reaction product of zinc oxide and an organic compound resulting from the reaction of capryl alcohol with a condensation product of turpentine and phosphorus pentasulfide.

6. A lubricating oil composition comprising a petroleum lubricating oil and a proportion, effective to retard oxidation of the composition, of the reaction product of zinc oxide and an organic compound resulting from the reaction of normal hexyl alcohol with a condensation product of turpentine and phosphorus pentasulfide.

7. A lubricating oil composition comprising a petroleum lubricating oil and a proportion, effective to retard oxidation of the composition, of the reaction product of zinc oxide and an organic compound resulting from the reaction of lauryl alcohol with a condensation product of turpentine and phosphorus pentasulfide.

8. A lubricating oil composition comprising a petroleum lubricating oil, a calcium salt of an octyl salicylate and a proportion, effective to retard oxidation of the composition, of the reaction product of zinc oxide and an organic compound resulting from the reaction of a monohydroxy aliphatic alcohol, having no fewer than five carbon atoms per molecule, with a condensation product of turpentine and phosphorus pentasulfide.

9. A lubricating oil composition comprising a petroleum lubricating oil, a calcium derivative of an alkylated salicylic acid as a detergent and a proportion, effective to retard oxidation of the composition, of the reaction product of zinc oxide and an organic compound resulting from the reaction of a monohydroxy aliphatic alcohol having no fewer than 5 carbon atoms per molecule with a condensation product of turpentine and phosphorus pentasulfide.

ROBERT L. MAY.

---

CERTIFICATE OF CORRECTION.

Patent No. 2,392,253. January 1, 1946.

ROBERT L. MAY.

It is hereby certified that error appears in the printed specification of the above numbered patent requiring correction as follows: Page 4, first column, line 34, for "21.5%" read --21.57%--; page 5, second column, line 33, for "the" first occurrence, read --this--; page 7, second column, line 8, Table VI, for "0 97" read --0.97--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.

3. A lubricating oil composition comprising a petroleum lubricating oil, a calcium salt of an isooctyl salicylate detergent and about 0.1% to 5% of a reaction product of zinc oxide and an organic compound resulting from the reaction of a monohydroxy aliphatic alcohol, having not fewer than 5 carbon atoms per molecule, with a condensation product of turpentine and phosphorus pentasulfide.

4. A lubricating oil composition comprising a petroleum lubricating oil, a calcium petroleum sulfonate detergent and a proportion, effective to retard oxidation of the composition, of the reaction product of zinc oxide and an organic compound resulting from the reaction of a monohydroxy aliphatic alcohol, having not fewer than 5 carbon atoms per molecule, with a condensation product of turpentine and phosphorus pentasulfide.

5. A lubricating oil composition comprising a petroleum lubricating oil and a proportion, effective to retard oxidation of the composition, of the reaction product of zinc oxide and an organic compound resulting from the reaction of capryl alcohol with a condensation product of turpentine and phosphorus pentasulfide.

6. A lubricating oil composition comprising a petroleum lubricating oil and a proportion, effective to retard oxidation of the composition, of the reaction product of zinc oxide and an organic compound resulting from the reaction of normal hexyl alcohol with a condensation product of turpentine and phosphorus pentasulfide.

7. A lubricating oil composition comprising a petroleum lubricating oil and a proportion, effective to retard oxidation of the composition, of the reaction product of zinc oxide and an organic compound resulting from the reaction of lauryl alcohol with a condensation product of turpentine and phosphorus pentasulfide.

8. A lubricating oil composition comprising a petroleum lubricating oil, a calcium salt of an octyl salicylate and a proportion, effective to retard oxidation of the composition, of the reaction product of zinc oxide and an organic compound resulting from the reaction of a monohydroxy aliphatic alcohol, having no fewer than five carbon atoms per molecule, with a condensation product of turpentine and phosphorus pentasulfide.

9. A lubricating oil composition comprising a petroleum lubricating oil, a calcium derivative of an alkylated salicylic acid as a detergent and a proportion, effective to retard oxidation of the composition, of the reaction product of zinc oxide and an organic compound resulting from the reaction of a monohydroxy aliphatic alcohol having no fewer than 5 carbon atoms per molecule with a condensation product of turpentine and phosphorus pentasulfide.

ROBERT L. MAY.

CERTIFICATE OF CORRECTION.

Patent No. 2,392,253. January 1, 1946.

ROBERT L. MAY.

It is hereby certified that error appears in the printed specification of the above numbered patent requiring correction as follows: Page 4, first column, line 34, for "21.5%" read --21.57%--; page 5, second column, line 33, for "the" first occurrence, read --this--; page 7, second column, line 8, Table VI, for "0 97" read --0.97--; and that the said Letters Patent should be read with this correction therein that the same may conform to the record of the case in the Patent Office.

Signed and sealed this 9th day of April, A. D. 1946.

Leslie Frazer (Seal) First Assistant Commissioner of Patents.